E. G. WAGNER.
APPARATUS FOR REGULATING THE FLOW OF WATER INTO SEWER FLUSH TANKS.
APPLICATION FILED DEC. 4, 1911.
1,055,841.
Patented Mar. 11, 1913.
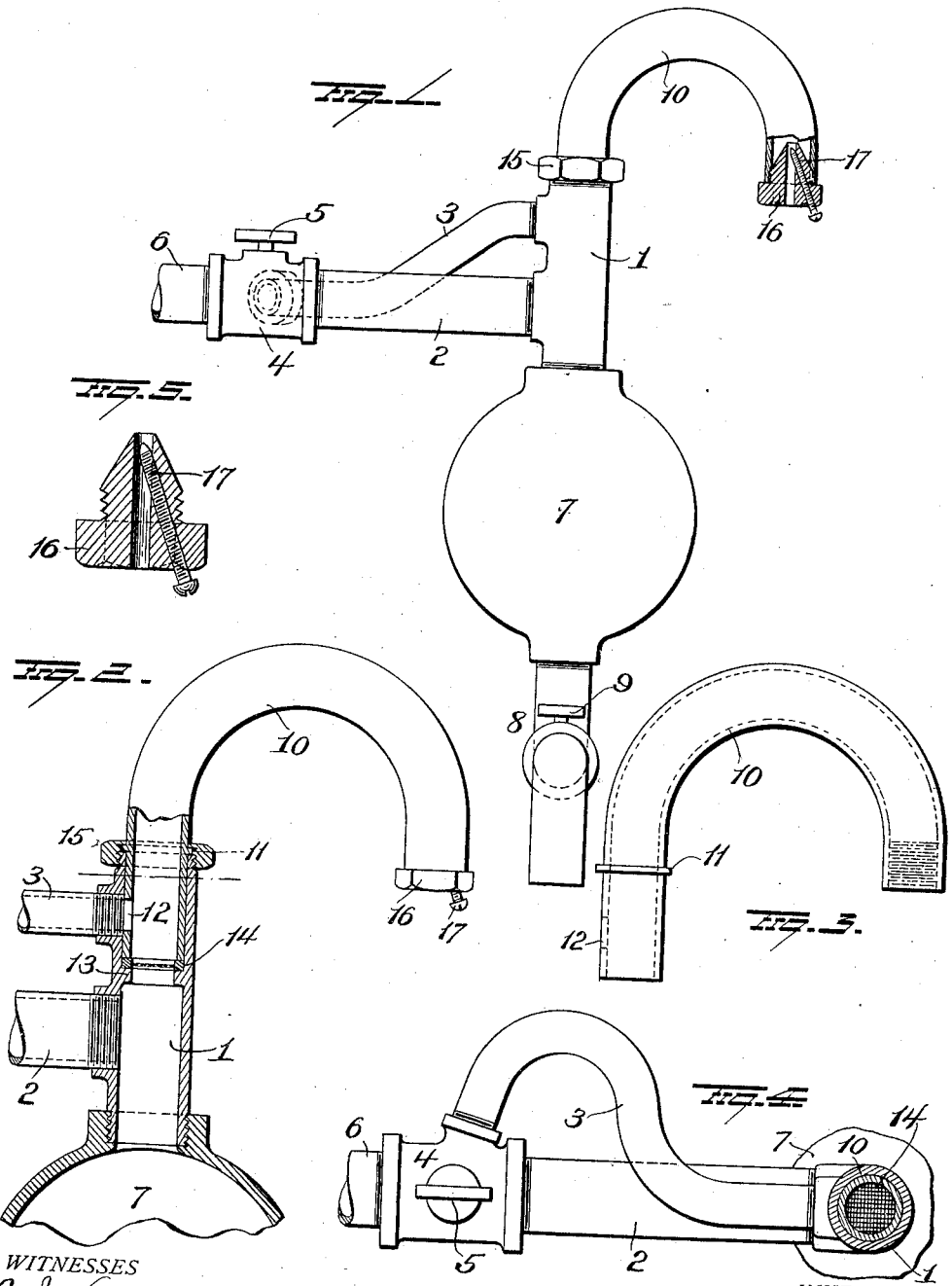

UNITED STATES PATENT OFFICE.

ERNEST G. WAGNER, OF LEWISTON, IDAHO.

APPARATUS FOR REGULATING THE FLOW OF WATER INTO SEWER FLUSH-TANKS.

1,055,841.

Specification of Letters Patent. Patented Mar. 11, 1913.

Application filed December 4, 1911. Serial No. 663,765.

*To all whom it may concern:*

Be it known that I, ERNEST G. WAGNER, a citizen of the United States, residing at Lewiston, in the county of Nez Perces and State of Idaho, have invented certain new and useful Improvements in Apparatus for Regulating the Flow of Water into Sewer Flush-Tanks; and I do hereby declare the following to be a full, clear, and exact description of the invention, such as will enable others skilled in the art to which it appertains to make and use the same.

My invention relates to an improvement in apparatus for regulating the flow of water into sewer flush tanks, or for other uses where a given amount of water in a given length of time is essential, and it consists in the parts and combination of parts, and in the details of construction as will be more fully explained and pointed out in the claims.

In the accompanying drawings, Figure 1 is a view in elevation, partly in section, of my improved apparatus. Fig. 2 is an enlarged view in section showing the manner of connecting the discharge and supply pipes, and sediment chamber, and also showing the screen and the manner of detachably securing it in place. Fig. 3 is a view of the discharge pipe. Fig. 4 is a view in plan of the water supply pipes, and Fig. 5 is a view of the discharge nozzle or plug and its regulating screw.

1 represents a receiving chamber, preferably cylindrical in shape, open at both ends, and provided at one side with internally threaded openings for the attachment of the main supply pipe 2, and the supplemental pipe 3. Pipes 2 and 3 are connected at their outer ends to the valve casing 4 carrying a three-way valve 5 of any approved construction, the valve casing 4, being connected by pipe 6 with a water main or other source of supply. By means of valve 5, water can be directed into chamber 1 through either pipe 2 or 3.

Connected to the lower end of receiving chamber 1, is the sediment chamber 7, preferably spherical in shape as shown, and provided at its lower end with the flush pipe 8 having a stop cock 9 therein.

Projecting into the upper end of the receiving chamber 1, is the discharge pipe 10. This pipe is preferably of U-shape, with one arm or member slightly longer than the other as clearly shown in Fig. 3. The free end of this long arm projects into the upper end of the receiving chamber 1, and is provided with the collar 11, which, resting on the upper end of the receiving chamber, limits the penetration of the pipe 10 into chamber 1. This pipe 10 projects into the receiving chamber beyond the opening for pipe 3, and is therefore provided with an opening 12, which when the parts are assembled is in line with the pipe 3, and permits of the free passage of water from pipe 3 into the receiving chamber. This chamber 1 is provided intermediate the supply pipe openings with an annular shoulder 13, on which the screen 14 rests, the form of the screen being preferably circular to conform to the shape of the interior of receiving chamber 1, and it is of a size to permit it to be readily placed in position and removed. The lower end of the longer member of the discharge pipe 10 rests on the top of the screen, thus holding the latter down onto its seat 13.

The collar 11 on discharge pipe 10 rests on the top of chamber 1, and is secured in place by the nut 15, which latter is recessed on its lower face to receive said collar, and is internally threaded to engage the external threads on the upper end of chamber 1.

Screwed into the discharge end of pipe 10 is the plug or nozzle 16. This nozzle consists of an angular head or end to be engaged by a wrench, and an exterially threaded body to engage internal threads in the free end of the shorter member of the pipe 10, the upper or inner end of said body being cone shaped, thereby affording a space around the plug at the upper end of the latter for the settlement of any sediment or foreign matter, and preventing the clogging of the comparatively small orifice or bore through the plug. This orifice or bore extends through the plug from the apex of the cone and is of size sufficient to permit of the passage of a steady and continuous but small stream of water.

Heretofore in apparatus for supplying a given quantity of water in a predetermined time, it has been customary to use calibrated plugs or nozzles, which have to be changed for different pressures, and which constantly wear and enlarge, thus increasing the flow, until within a comparatively short time, it becomes necessary to supply a new one. I overcome this objection by providing the plug or nozzle with a hole at about a 60° angle, intersecting the bore of the plug near the top and adjustably secured in the hole is the screw valve 17. This valve is not intended for cutting off the supply, nor is it constructed to do so, but is designed simply as a choke for the bore so that as the latter enlarges by the constant flow therethrough, the enlargement can be compensated for or taken up by the screw valve 17.

The pipe 10 discharges into a sewer flush tank or into any other tank or receptacle where a given amount of water in a given length of time is essential, and in the operation of the apparatus, the valve 5 is turned so that the supply enters the receiving chamber 1 below screen 14, and passes up through the latter and out through the discharge pipe 10. The foreign matter is stopped by the screen and falls back into the sediment chamber and may be discharged from the latter by simply opening the cock 9 which permits the water to flow through and flush the sediment chamber. When it is desired or becomes necessary to clean the screen, the valve 5 is given a quarter turn which cuts off the flow of water through pipe 2 and directs it through pipe 3 to chamber 1 above the screen. The cock 9 should also be opened, and as the outlet through the nozzle or plug 16 is restricted, the pressure within the discharge pipe will force the water through the screen, thus removing all foreign matter adhering to the underside thereof. By this arrangement the apparatus can be cleaned without disconnecting or removing a single part, but if necessary to remove the screen it can be readily and quickly done by simply unscrewing the nut 15 from the receiving chamber 1 and withdrawing discharge pipe 10, thus leaving the screen exposed and free to be removed.

With this apparatus the flow of water can be regulated and controlled so as to prevent any waste, and as the parts are so proportioned that there is no appreciable flow through the pipe 10, any sediment or foreign matter entering below the screen will settle down into the sediment chamber, and any that should be carried up through pipe 10 will settle around the conical upper end of the nozzle or plug 16.

While I have referred to the improvement as applied to a sewer flush tank, I would have it understood that it is adapted for all uses where a given amount of water in a given length of time is essential. Neither do I limit myself to the exact details of all the parts not specifically claimed but consider myself at liberty to make such changes as fairly fall within the spirit and scope of my invention.

Having fully described my invention what I claim as new and desire to secure by Letters-Patent is:

1. The combination of a receiving chamber provided with an internal shoulder, a screen resting on said shoulder, two water supply pipes communicating with said chamber, one above and the other below the screen, a sediment chamber communicating with the lower end of said receiving chamber and a discharge pipe leading from the upper end of same, the lower end of said discharge pipe resting on the screen and provided with an opening coincident with the supply pipe opening above the screen and means for detachably securing the discharge pipe to said receiving chamber.

2. The combination of a receiving chamber provided with an internal seat, a screen on said seat, a sediment chamber communicating with the receiving chamber below the screen, a discharge pipe projecting into the receiving chamber and provided with a collar resting on the upper end of said receiving chamber, a nut secured to said latter chamber and overhanging the collar on the pipe, and two water pipes, one leading to the receiving chamber above the screen and the other to the receiving chamber below the screen.

In testimony whereof, I have signed this specification in the presence of two subscribing witnesses.

ERNEST G. WAGNER.

Witnesses:
WINFIELD S. WILKINSON,
EUGENE M. BOOTH.

Copies of this patent may be obtained for five cents each, by addressing the "Commissioner of Patents, Washington, D. C."